(12) United States Patent
Nanbu et al.

(10) Patent No.: US 10,864,596 B2
(45) Date of Patent: Dec. 15, 2020

(54) METAL LAMINATE MATERIAL AND PRODUCTION METHOD THEREFOR

(71) Applicant: Toyo Kohan Co., Ltd., Tokyo (JP)

(72) Inventors: Kouji Nanbu, Kudamatsu (JP); Teppei Kurokawa, Kudamatsu (JP); Takashi Koshiro, Kudamatsu (JP); Hironao Okayama, Kudamatsu (JP)

(73) Assignee: Toyo Kohan Co., Ltd., Tokyo (JP)

( * ) Notice: Subject to any disclaimer, the term of this patent is extended or adjusted under 35 U.S.C. 154(b) by 0 days.

(21) Appl. No.: 15/764,381

(22) PCT Filed: Sep. 30, 2016

(86) PCT No.: PCT/JP2016/078988
§ 371 (c)(1),
(2) Date: Mar. 29, 2018

(87) PCT Pub. No.: WO2017/057665
PCT Pub. Date: Apr. 6, 2017

(65) Prior Publication Data
US 2018/0281103 A1    Oct. 4, 2018

(30) Foreign Application Priority Data

Sep. 30, 2015  (JP) .................................. 2015-193075

(51) Int. Cl.
*B23K 20/04* (2006.01)
*C21D 9/46* (2006.01)
(Continued)

(52) U.S. Cl.
CPC ................ *B23K 20/04* (2013.01); *B21B 1/22* (2013.01); *B32B 15/01* (2013.01); *B32B 15/012* (2013.01);
(Continued)

(58) Field of Classification Search
None
See application file for complete search history.

(56) References Cited

U.S. PATENT DOCUMENTS 8,813,342 B2 * 8/2014 Bergstrom ............. B23K 20/04
29/514

FOREIGN PATENT DOCUMENTS

JP    1-95883    4/1989
JP    1-317692   12/1989
(Continued)

OTHER PUBLICATIONS

International Search Report based on PCT/JP2016/078988, dated Dec. 27, 2016—2 Pages.

*Primary Examiner* — Daniel J. Schleis
(74) *Attorney, Agent, or Firm* — McCarter & English, LLP

(57) ABSTRACT

It is an objective of the present invention to provide a metal laminate material, which has sufficient strength as well as molding processability, lightweight properties, and radiation performance, which is a metal laminate material that has a two-layer structure of a stainless steel layer and an aluminum layer or a three-layer structure of a 1st stainless steel layer, an aluminum layer, and a 2nd stainless steel layer, wherein tensile strength TS is $200 \leq TS \leq 550$ (MPa), elongation EL is not less than 15%, and a surface hardness Hv of the stainless steel layer is not more than 300 for the metal laminate material.

7 Claims, 12 Drawing Sheets

(51) Int. Cl.
*B32B 15/01* (2006.01)
*C21D 6/00* (2006.01)
*B21B 1/22* (2006.01)
*C22C 38/06* (2006.01)
*C22C 38/44* (2006.01)
*B23K 103/20* (2006.01)
*C22C 38/40* (2006.01)

(52) U.S. Cl.
CPC ............... *C21D 6/00* (2013.01); *C21D 9/46* (2013.01); *C22C 38/06* (2013.01); *B23K 2103/20* (2018.08); *C21D 2251/02* (2013.01); *C22C 38/40* (2013.01); *C22C 38/44* (2013.01); *Y10T 428/12757* (2015.01)

(56) References Cited

FOREIGN PATENT DOCUMENTS

| | | | | |
|---|---|---|---|---|
| JP | 8-39269 | 2/1996 | | |
| JP | 2000-312979 | 11/2000 | | |
| JP | 2004-306458 | 11/2004 | | |
| JP | 2004306458 | * 11/2004 | ............. | B32B 15/01 |
| JP | 2004-351460 | 12/2004 | | |
| JP | 2015-62922 | 4/2015 | | |

* cited by examiner

A

B

C

A

B

METAL LAMINATE MATERIAL AND PRODUCTION METHOD THEREFOR

CROSS-REFERENCE TO RELATED APPLICATIONS

This application is a national stage application filed under 35 USC 371 of PCT/JP2016/078988, filed Sep. 30, 2016, which claims the benefit of Japanese Patent Application No. 2015-193075, filed Sep. 30, 2015, each of which is incorporated herein, in its entirety, by reference.

TECHNICAL FIELD

The present invention relates to a metal laminate material and a production method therefor.

BACKGROUND ART

Metal materials are used in various fields. For example, metal materials are used for heat radiating members for electronic devices such as mobile electronic devices, etc. Metal materials used for such members are required to have lightweight properties, high strength, high radiation performance, and molding processability. As such metal materials, laminate materials, in which a high strength aluminum material or a stainless steel and a carbon sheet are laminated, are widely used at present.

Although high strength aluminum materials are lightweight and excellent in radiation performance, they have poor molding processability. Meanwhile, although a laminate material of a stainless steel and a carbon sheet is excellent in molding processability, the carbon sheets are very expensive and inferior to aluminum materials in terms of radiation performance.

As other metal materials for the heat radiating members, a metal laminate material (clad material) obtained by laminating two or more metal plates or metal foils are under consideration. For example, there is a discussion on a metal laminate material of a stainless steel and aluminum. The metal laminate material is excellent in combination with that it has lightweight properties and radiation performance of aluminum and molding processability of a stainless steel. Known examples of the metal laminate material are disclosed in Patent Literature 1 to 3.

Patent Literature 1 discloses a hard-soft laminate material obtained by laminating a hard layer and a soft layer, characterized in that at least one bonded surface of the hard-soft laminate material is obtained by activating each surface to be bonded, coming into contact with the other surface, superimposing and bonding the surfaces. Patent Literature 1 also discloses that the hard layer comprises a stainless steel layer and the soft layer comprises an aluminum layer.

Patent Literature 2 discloses a dissipater plate material having a three-layer clad structure for electronic devices, characterized in that it comprises an aluminum material serving as an outer layer material and stainless steel serving as a core material.

Patent Literature 3 discloses an aluminum/stainless steel clad material, which is a clad material obtained by bonding a hard aluminum plate comprising an Al group metal mainly consisting of Al to one surface of a metal stainless steel plate, for which hardness of the stainless steel plate is not more than Hv400 while hardness of the hard aluminum plate is not less than Hv40, and bonding strength between the stainless steel plate and the hard aluminum plate is not less than 0.3 kgf/cm.

A metal laminate material of stainless steel and aluminum, which is produced by cold rolling, has poor molding processability because stainless steel and aluminum become hardened as a result of work-hardening. Work-hardened aluminum in the obtained metal laminate material can be softened due to being recrystallized by heat treatment. However, since the recrystallization temperature of stainless steel is higher than the melting point of aluminum, heat treatment in a temperature range that allows recrystallization of stainless steel would cause aluminum to melt. For such reason, it is impossible to recrystallize both work-hardened stainless steel and aluminum in the metal laminate material of stainless steel and aluminum, which is produced by cold rolling, making it difficult to obtain a material having sufficient molding processability. In a particular case in which the metal laminate material has a relatively high level of thickness, it may have a certain level of molding processability even with an increase in hardness of stainless steel. However, in a case in which thickness of the metal laminate material is as small as not more than 500 μm, it results in poor molding processability.

CITATION LIST

Patent Literature

Patent Literature 1: JP Patent Publication (Kokai) No. 2004-306458 A
Patent Literature 2: JP Patent Publication (Kokai) No. 2015-62922 A
Patent Literature 3: JP Patent Publication (Kokai) No. 2000-312979 A

SUMMARY OF INVENTION

Technical Problem

As stated above, in a case in which a metal laminate material of a stainless steel and aluminum has a thin thickness, it has been difficult to obtain the metal laminate material, which has a characteristic of stainless steel that is excellent in molding processability and a characteristic of aluminum that has excellent radiation performance and lightweight properties, and which also has sufficient strength.

Therefore, it is an objective of the present invention to provide the metal laminate material, which has sufficient strength as well as molding processability, lightweight properties, and radiation performance.

Solution to Problem

As a result of intensive studies to achieve the above objective, regarding a metal laminate material of stainless steel and aluminum, the present inventors found that the metal laminate material having specific mechanical properties has sufficient strength as well as excellent molding processability, radiation performance, and lightweight properties. This has led to the completion of the present invention. Specifically, the present invention is summarized as follows.

(1) The metal laminate material, which has a two-layer structure of the stainless steel layer and the aluminum layer or a three-layer structure of the 1st stainless steel layer, the aluminum layer, and the 2nd stainless steel layer, wherein tensile strength TS is 200≤TS≤550 (MPa), elongation EL is not less than 15%, and the surface hardness (Hv) of the stainless steel layer is not more than 300 for the metal laminate material.

(2) The metal laminate material according to (1), which has the thickness of 50 μm to 500 μm.

(3) The metal laminate material according to (1) or (2), wherein each stainless steel layer has an average crystal grain size of 1.5 μm to 10 μm, and the number of shear bands traversing a straight line having a length of 10 μm, the straight line extending along the normal direction (ND) in a sample coordinate system on a cross-sectional observation image viewed from the transverse direction (TD) in the sample coordinate system, is less than 5 for the stainless steel layer.

(4) A method for producing the metal laminate material having a two-layer structure of the stainless steel layer and the aluminum layer according to any one of (1) to (3), which comprises: a step of sputter-etching the stainless steel foil having the surface hardness Hv of not more than 300; a step of sputter-etching the aluminum foil having the surface hardness Hv of not less than 20; and a step of pressure-bonding a sputter-etched side of the stainless steel foil and a sputter-etched side of the aluminum foil at a reduction rate of not more than 10%, thereby obtaining the metal laminate material having the two-layer structure of the stainless steel layer and the aluminum layer.

(5) A method for producing the metal laminate material having a three-layer structure of a 1st stainless steel layer, an aluminum layer, and a 2nd stainless steel layer according to any one of (1) to (3), which comprises: a step of sputter-etching the 1st stainless steel foil having the surface hardness Hv of not more than 300; a step of sputter-etching the aluminum foil having the surface hardness Hv of not less than 20; and a step of pressure-bonding a sputter-etched side of the 1st stainless steel foil and the sputter-etched side of the aluminum foil at a reduction rate of not more than 10%, thereby obtaining the two-layer material of the 1st stainless steel layer and the aluminum layer; a step of sputter-etching the aluminum layer side of the two-layer material; a step of sputter-etching the 2nd stainless steel foil having the surface hardness Hv of not more than 300; and a step of pressure—bonding the sputter-etched side of the two-layer material and the sputter-etched side of the 2nd stainless steel foil at a reduction rate of not more than 10%, thereby obtaining the metal laminate material having the three-layer structure of the 1st stainless steel layer, the aluminum layer, and the 2nd stainless steel layer.

(6) The method for producing the metal laminate material according to (4) or (5), which further comprises a step of heat-treating the obtained metal laminate material at 100° C. to 500° C.

The present description includes part or all of the contents as disclosed in the description and/or drawings of Japanese Patent Application No. 2015-193075, which is a priority document of the present application.

Advantageous Effects of Invention

According to the present invention, a metal laminate material, which has sufficient strength as well as excellent molding processability, radiation performance, and lightweight properties, can be provided.

BRIEF DESCRIPTION OF DRAWINGS

FIG. 9A is a view of a stainless steel foil 1, FIG. 9B is a view of a stainless steel layer of a bonded metal laminate material (as clad) (Example 1-1), and FIG. 9C is a view of a stainless steel layer of a bonded and heat-treated metal laminate material (Example 1-2).

FIG. 10A is a view of a stainless steel foil 2, and FIG. 10B is a view of a stainless steel layer of a bonded and heat-treated metal laminate material (Example 2-2).

FIG. 11A is a view of a stainless steel foil 1, and FIG. 11B is a view of a stainless steel layer of a bonded and heat-treated metal laminate material (Example 1-2).

FIG. 12A is a view of a stainless steel foil 3, and FIG. 12B is a view of a stainless steel layer of a bonded and heat-treated metal laminate material (Comparative Example 1-2).

DESCRIPTION OF EMBODIMENTS

Figure 1:
FIG. 1 is a cross-sectional view that schematically illustrates one embodiment of the metal laminate material of the present invention (two-layer material).

The present invention is described in detail below.

The metal laminate material of the present invention is a metal laminate material consisting of a stainless steel layer and an aluminum layer, which is formed by laminating the stainless steel layer and the aluminum layer. The metal laminate material of the present invention is a metal laminate material (two-layer material) having a two-layer structure of a stainless steel layer and an aluminum layer, in which the stainless steel is laminated on only one side of the aluminum, or a metal laminate material (three-layer material) having a three-layer structure of a 1st stainless steel layer, an aluminum layer, and a 2nd stainless steel layer, in which the stainless steel is laminated on both sides of the aluminum. The three-layer material of the present invention, in which the stainless steel is laminated on both sides of the aluminum, is superior to the three-layer material, in which the aluminum is laminated on both sides of the stainless steel, in terms of molding processability and corrosion resistance.

The two-layer material of the present invention has an aluminum surface, and thus, it is superior, in terms of radiation performance, to the three-layer material, which is equivalent thereto in thickness and the thickness ratio. In addition, steps of producing the two-layer material of the present invention are fewer than steps of producing the three-layer material. Therefore, the two-layer material of the present invention is advantageous in terms of productivity and cost. The three-layer material of the present invention has the stainless steel layer on both surfaces of the laminate material, and thus, it has excellent scratch resistance and corrosion resistance. In the present invention, the two-layer material or the three-layer material may be selected depending on the intended use or desired properties of the metal laminate material.

I. Material

Examples of the stainless steels used for the metal laminate material of the present invention include, but are not particularly limited to, stainless steel foils of SUS304, SUS201, SUS316, SUS316L, and SUS430.

The thickness of the stainless steel used for the metal laminate material of the present invention is not particularly limited. It is usually 5 μm to 400 μm. The lower limit thereof is preferably not less than 10 μm. In a case in which the surface hardness (Hv) of the stainless steel is not more than 249, the thickness is more preferably not less than 20 μm in view of handling. The upper limit thereof is preferably less than 300 μm and more preferably less than 210 μm. As the thickness of the stainless steel to be used increases, the tensile strength, elongation, and molding processability of the metal laminate material can be improved.

The surface hardness of the stainless steel Hv used for the metal laminate material of the present invention is preferably not more than 300. It is more preferably not more than 280 in view of favorable molding processability and handling. When it is desirable to improve moldability, the surface hardness Hv is particularly preferably not more than 249. When stainless steel is pressure-bonded to aluminum, processing strain is caused in the stainless steel, which usually results in an increase in the surface hardness Hv. In this regard, the difference between the surface hardness (Hv) of unbonded stainless steel and the surface hardness (Hv) of the stainless steel layer bonded to the aluminum is preferably not more than 100, more preferably not more than 80, and further preferably not more than 50. When the hardness difference exceeds 100, processing strain in the stainless steel layer excessively increases and it causes deterioration of molding processability, which is not preferable. In the present invention, the surface hardness Hv can be determined using, for example, a micro-Vickers hardness tester (load: 100 gf) in accordance with JIS Z 2244 (Vickers hardness test—test method).

Preferably, the stainless steel used for the metal laminate material of the present invention has an average crystal grain size of 1.5 μm to 10 μm as defined below, and the number of shear bands traversing a straight line having a length of 10 μm along ND in a sample coordinate system is less than 5 for the stainless steel. The average crystal grain size and the number of shear bands are determined in the same manner as in the case of the metal laminate material described below. By controlling a reduction rate within a specific range described below using such stainless steel upon production of a metal laminate material, it becomes possible to securely obtain a metal laminate material, for which tensile strength TS(MPa) is 200≤TS≤550, elongation EL is not less than 15%, and the surface hardness Hv of the stainless steel layer is not more than 300. In a case in which the number of shear bands is large for unbonded stainless steel or in a case in which the reduction rate for production of the metal laminate material is high, the number of shear bands in the laminated stainless steel layer increases, which might cause reduction of molding processability.

Examples of aluminum that can be used for the metal laminate material of the present invention include, but are not particularly limited to, a pure aluminum foil and an aluminum alloy foil. Examples of the aluminum alloys that can be used include 1000-series, 3000-series, and 5000-series aluminum alloys specified in accordance with JIS.

The thickness of aluminum used in the metal laminate material of the present invention is not particularly limited. It is usually 10 μm to 490 μm. The lower limit thereof is preferably not less than 15 μm and more preferably not less than 20 μm. The upper limit thereof is preferably not more than 470 μm and more preferably not more than 450 μm.

The surface hardness Hv of aluminum used for the metal laminate material of the present invention is not particularly limited. For example, the lower limit thereof is not less than 20, and in view of handling and scratch resistance, it is preferably not less than 40. The upper limit thereof is not more than 150 and preferably not more than 100.

II. Metal Laminate Material

As illustrated in FIG. 1, the two-layer material of the present invention 1 has a two-layer structure of the stainless steel layer 21 and the aluminum layer 10, in which the stainless steel layer 21 is bonded to only one side of the aluminum layer 10.

Figure 2:
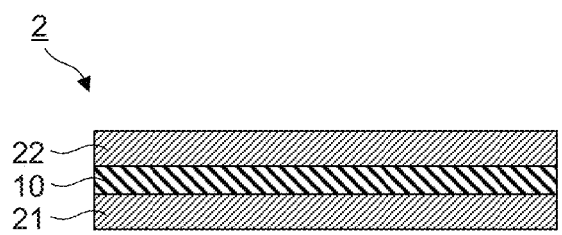
FIG. 2 is a cross-sectional view that schematically illustrates one embodiment of the metal laminate material of the present invention (three-layer material).

As illustrated in FIG. 2, the three-layer material 2 of the present invention has a three-layer structure of the 1st stainless steel layer 21, the aluminum layer 10, and the 2nd stainless steel layer 22, in which the 1st stainless steel layer 21 and the 2nd stainless steel layer 22 are respectively bonded to both sides of the aluminum layer 10.

The thickness of the metal laminate material of the present invention is not particularly limited. It is usually 50 μm to 500 μm, preferably 50 μm to 400 μm, more preferably 50 μm to less than 300 μm, and particularly preferably 50 μm to 200 μm. According to the present invention, the thickness of the metal laminate material refers to the total thickness of the stainless steel layer and the aluminum layer in the case of the two-layer material, and it also refers to the total thickness of the 1st stainless steel layer, the aluminum layer, and the 2nd stainless steel layer in the case of the three-layer material. The metal laminate material of the present invention is surprisingly advantageous in that even when it has a thin thickness, it can achieve excellent molding processability.

According to the metal laminate material of the present invention, a ratio of the aluminum layer thickness to the stainless steel layer thickness (aluminum layer thickness/stainless steel layer thickness) is, for example, 0.1 to 100 and preferably 0.3 to 50. According to the metal laminate material of the present invention, a ratio of the aluminum layer thickness and the stainless steel layer thickness falls within the above range, thereby allowing the metal laminate material to be lightweight and have sufficient strength, molding processability, and adherence between the aluminum layer and the stainless steel layer.

Tensile strength TS of the metal laminate material of the present invention is 200≤TS≤550 (MPa). From the viewpoint that a metal laminate material is allowed to have favorable strength and molding processability, it is preferably 200≤TS≤500. When the TS of the metal laminate material is not less than 200, the metal laminate material is allowed to have sufficient strength. When the TS is not more than 550, the metal laminate material is allowed to have high strength and sufficient molding processability. Tensile strength TS can be determined in accordance with JIS Z 2241 (metal material tensile testing method) using, for example, Autograph AGS-5kNX (manufactured by Shimadzu Corporation).

Elongation EL of the metal laminate material of the present invention is not less than 15%. In view of favorable molding processability, it is preferably not less than 25% and more preferably not less than 30%. Elongation EL can be determined in accordance with elongation after fracture measurement specified in JIS Z 2241 using, for example, a test piece of a tensile strength test.

According to the metal laminate material of the present invention, the surface hardness Hv of the stainless steel layer is not more than 300. In view of favorable molding processability, it is preferably not more than 280. In a case in which the metal laminate material of the present invention is a three-layer material, each of a 1st stainless steel layer and a 2nd stainless steel layer has the above surface hardness Hv. When the surface hardness Hv of the stainless steel layer is not more than 280, a metal laminate material is less susceptible to a solid-solution element, a precipitate, processing strain, or the like which causes an increase in surface hardness thereof, and thus, it is allowed to have further improved moldability with a low risk of lack of molding processability.

The metal laminate material of the present invention has the above-described mechanical properties such as tensile strength, elongation, and the surface hardness of the stainless steel layer, and therefore, it has favorable molding processability. Specifically, the metal laminate material of the present invention has a dome height in Erichsen cupping test (Ericksen value) of not less than 4.6 mm, preferably not less than 5.0 mm, and more preferably not less than 6.0 mm, indicating that it has high molding processability. According to the present invention, the dome height in Erichsen cupping test can be determined in accordance with JIS Z 2247 (method of Erichsen cupping test) using, for example, a mechanical Erichsen cupping tester ESM-1 (CAP2 mm, manufactured by Tokyo Koki Testing Machine Co., Ltd.). The metal laminate material of the present invention is surprisingly advantageous in that even in a case in which a metal laminate material has a thin thickness (e.g., 50 μm to 500 μm), the metal laminate material has the above-described mechanical properties such as a tensile strength, an elongation, and the surface hardness of the stainless steel layer, and therefore, it has high molding processability.

In addition, according to the metal laminate material of the present invention, it is preferable that the stainless steel layer has an average crystal grain size of 1.5 μm to 10 μm, and the number of shear bands traversing a straight line having a length of 10 μm, the straight line extending along the normal direction (ND) in a sample coordinate system on a cross-sectional observation image viewed from the transverse direction (TD) in the sample coordinate system, is less than 5 for the stainless steel layer. Accordingly, high molding processability can be achieved. The average crystal grain size is more preferably 1.5 μm to 8.0 μm and particularly preferably 2.0 μm to 6.0 μm. In addition, the number of shear bands traversing a straight line having a length of 10 μm is more preferably not more than 3, further preferably not more than 1, and particularly preferably 0.

The term "average crystal grain size" used herein refers to an average grain size of 30 crystal grains, provided that the average crystal grain is an average of a long diameter and a short diameter measured for each of 30 crystal grains randomly selected on a cross-sectional observation image of a scanning electron microscope (SEM) viewed from TD in a sample coordinate system of a metal laminate material. In addition, according to the present invention, the number of traversing shear bands is an average of the number of shear bands traversing a straight line obtained for 10 straight lines each having a length of 10 μm, the straight lines being each drawn along the thickness direction (ND in a sample coordinate system) of a metal laminate material on a cross-sectional observation image obtained by SEM viewed from TD in the sample coordinate system of the metal laminate material.

According to the present invention, RD represents a rolling direction, TD represents a transverse direction that is perpendicular to the rolling direction, ND represents a normal direction relative to a rolled face (plate face).

III. Method for Producing Metal Laminate Material

The two-layer material of the present invention can be produced by a method comprising: a step of sputter-etching a stainless steel foil having a surface hardness Hv of not more than 300 (step 1); a step of sputter-etching an aluminum foil having a surface hardness Hv of not less than 20 (step 2); and a step of pressure-bonding a sputter-etched side of the stainless steel foil and a sputter-etched side of the aluminum foil at a reduction rate of not more than 10%, thereby obtaining a metal laminate material having a two-layer structure of the stainless steel layer and the aluminum layer (step 3).

In steps 1 and 2 of the method for producing the two-layer material of the present invention, sputter etching is performed on each surface to be bonded of the stainless steel foil and the aluminum foil.

Specifically, sputter etching treatment is conducted in a manner such that: the stainless steel foil and the aluminum foil are each prepared in the form of long coil 100 mm to 600 mm in width; the stainless steel foil and the aluminum foil, each of which has a surface to be bonded, is earthed as electrodes; an alternating current of 1 MHz to 50 MHz is applied between each electrode and a different electrode supported by an insulator for glow discharge generation; and the area of each electrode, which is exposed to plasma generated by glow discharge, is set to not more than one-third (⅓) of the area of the different electrode. During sputter etching treatment, each of the earthed electrodes functions as a cooling role, thereby preventing an increase in the temperature of each of materials to be conveyed.

Sputter etching treatment is intended to sputter surfaces to be bonded of the stainless steel foil and the aluminum foil in a vacuum using an inert gas, thereby completely removing surface adsorbates of each foil and removing a part or all of a surface oxide film. It is not always necessary to completely remove the oxide film. Sufficient bonding force can be obtained even when the oxide film is partially left. It is possible to remarkably reduce sputter etching treatment time so as to improve production of a metal laminate material by allowing the oxide film to be partially left, compared with the case of complete removal of the oxide film. As an inert gas, argon, neon, xenon, krypton, and a mixed gas containing at least one of such gases can be used. It is possible to completely remove surface adsorbates of either a stainless steel foil or an aluminum foil at an etching depth of approximately 1 nm.

Sputter etching treatment of a stainless steel foil can be conducted in vacuo at, for example, a plasma output of 100 W to 10 KW and a line rate of 1 m/minute to 30 m/minute. The degree of vacuum during sputter etching treatment is preferably high such that readsorption to the surface can be prevented. It, may be, for example, $1 \times 10^{-5}$ Pa to 10 Pa. Upon sputter etching treatment, the temperature of the stainless steel foil is maintained at preferably ordinary temperature to 150° C. in view of preventing softening of the aluminum foil.

A stainless steel foil, on the surface of which an oxide film is partially left, can be obtained by setting the stainless steel foil etching depth to, for example, 1 nm to 10 nm. The etching depth may exceed 10 nm, if necessary.

Sputter etching treatment of an aluminum foil can be conducted in vacuo at, for example, a plasma output of 100 W to 10 KW and a line rate of 1 m/minute to 30 m/minute. The degree of vacuum during sputter etching treatment is preferably high such that readsorption to the surface can be prevented. It, may be $1 \times 10^{-5}$ Pa to 10 Pa.

According to the present invention, aluminum, on the surface of which an oxide film is partially left, can be obtained by setting the aluminum etching depth to, for example, 1 nm to 10 nm. The etching depth may exceed 10 nm, if necessary.

In step 3 of the method for producing a two-layer material of the present invention, a sputter-etched side of a stainless steel foil and a sputter-etched side of an aluminum foil are pressure-bonded at a reduction rate of not more than 10% by, for example, roll bonding, thereby bonding the stainless steel foil and the aluminum foil. A linear load upon rolling is not particularly limited for roll bonding. It may be set to, for example, 0.1 to 10 tf/cm. In addition, the temperature for bonding by roll bonding is not particularly limited. It is, for example, ordinary temperature to 150° C.

According to the method for producing a two-layer material of the present invention, a reduction rate upon pressure bonding of the stainless steel foil and the aluminum foil is not more than 10% and preferably not more than 3%. When the reduction rate is not more than 10%, it is possible to prevent generation of processing strain to a large extent in the stainless steel layer and the aluminum layer, thereby improving molding processability of the metal laminate material to be obtained. In addition, when the reduction rate is not more than 10%, it is possible to avoid reduction of molding processability caused by an increase in the number of shear bands in the stainless steel layer. The lower limit of the reduction rate is 0% because the thickness of each layer is not necessarily changed before and after pressure bonding.

It is preferable to perform bonding by roll bonding in a non-oxidizing atmosphere such as an inert gas atmosphere of Ar or the like in order to prevent a decrease in bonding strength between the stainless steel foil and the aluminum foil surface due to readsorption of oxygen to both foils.

The three-layer material of the present invention can be produced by a method comprising: a step of sputter-etching the aluminum layer side of the two-layer material (step 4); a step of sputter-etching a 2nd stainless steel foil having a surface hardness Hv of not more than 300 (step 5); and a step of pressure-bonding a sputter-etched side of the two-layer material and a sputter-etched side of the 2nd stainless steel foil at a reduction rate of not more than 10%, thereby obtaining a metal laminate material having a three-layer structure of a 1st stainless steel layer, an aluminum layer, and a 2nd stainless steel layer (step 6).

Specifically, the three-layer material of the present invention can be obtained by a method comprising: a step of sputter-etching the 1st stainless steel foil having a surface hardness Hv of not more than 300 (step 1); a step of sputter-etching the aluminum foil having a surface hardness Hv of not less than 20 (step 2); a step of pressure-bonding a sputter-etched side of the 1st stainless steel foil and a sputter-etched side of the aluminum foil at a reduction rate of not more than 10%, thereby obtaining the two-layer material of the 1st stainless steel layer and the aluminum layer (step 3); a step of sputter-etching the aluminum layer side of the two-layer material (step 4); a step of sputter-etching the 2nd stainless steel foil having the surface hardness Hv of not more than 300 (step 5); and a step of pressure-bonding a sputter-etched side of the two-layer material and a sputter-etched side of the 2nd stainless steel foil at a reduction rate of not more than 10%, thereby obtaining the metal laminate material having the three-layer structure of the 1st stainless steel layer, the aluminum layer, and the 2nd stainless steel layer (step 6).

In steps 4 and 5 of the method for producing a three-layer material of the present invention, each surface to be bonded of the aluminum layer of the two-layer material and the 2nd stainless steel foil are sputter-etched. Sputter etching treatment in step 4 can be conducted in the same manner as in step 2 of the method for producing the two-layer material, and sputter etching treatment in step 5 can be conducted in the same manner as in step 1 of the method for producing the two-layer material.

In step 6 of the method for producing a three-layer material of the present invention, the sputter-etched side of the aluminum layer of the obtained two-layer material and the sputter-etched side of the 2nd stainless steel foil are pressure-bonded at a reduction rate of not more than 10%, thereby bonding the aluminum layer side of the two-layer material and the stainless steel foil. This step can be conducted in the same manner as in step 3 in the method for producing the two-layer material. Here, it is preferable that the total reduction rate, which is a reduction from the thickness of an original test material to the thickness of the laminate material obtained as a final product, is set to not more than 10%.

The two-layer material and the three-layer material of the present invention obtained by the above production methods may be further heat-treated, if necessary. Processing strain in the aluminum layer is removed by heat treatment, thereby improving adherence between the layers. This heat treatment is preferably conducted at a temperature at which aluminum does not melt. It is preferable to conduct heat treatment at, for example, not more than 500° C.

Further, it is preferable to conduct the heat treatment at a temperature at which at least metal elements of a stainless steel layer are thermally diffused into an aluminum layer. Examples of metal elements that can be thermally diffused include Fe, Cr, and Ni. As a result of thermal diffusion, bonding force is improved. Metal elements contained in the stainless steel layer and the aluminum layer may be mutually thermally diffused.

Specifically, the metal laminate material can be heat-treated at 100° C. to 500° C. When the heat treatment temperature falls within this range, thermal diffusion allows the obtained metal laminate material to have high bonding force. The heat treatment temperature is preferably 200° C. to 400° C. in view of the improvement of bonding force. Heat treatment time varies depending on temperatures. However, it is desirable to maintain heat at, for example, 300° C. for 1 second (not including temperature rising time) to 240 minutes.

EXAMPLES

The present invention is described in detail with reference to the Examples and Comparative Examples below. However, the present invention is not limited to these Examples.

Examples 1 to 3 and Comparative Examples 1 and 2

A metal laminate material having a three-layer structure was produced using, as a 1st stainless steel foil and a 2nd stainless steel foil, any one of stainless steel foils 1 to 5 in Table 1 and, as an aluminum foil, an aluminum foil 1 or 2 in Table 1. Table 1 lists characteristic values of each test material.

TABLE 1

| Test Material | Temper Designation | Thickness (μm) | Surface Hardness Hv | Tensile Strength TS (MPa) | Elongation EL (%) | Dome Height (mm) |
|---|---|---|---|---|---|---|
| Stainless steel foil 1 | SUS316 | BA | 49.4 | 200.82 | 503.25 | — | 8.09 |
| Stainless steel foil 2 | SUS316L | ½H | 50.2 | 257.76 | 704 | 45.5 | 5.98 |
| Stainless steel foil 3 | SUS316L | H | 49.6 | 372.4 | 1095 | 3.6 | 2.98 |
| Stainless steel foil 4 | SUS316L | BA | 98.0 | 168.06 | 642 | 58 | 8.855 |
| Stainless steel foil 5 | SUS304 | ¾H | 201.8 | 377.2 | — | — | 6.18 |
| Aluminum foil 1 | A1050 | H18 | 98.6 | 62.88 | 249 | 6 | 3.15 |
| Aluminum foil 2 | A1050 | H18 | 195.6 | 58.8 | — | — | 3.43 |
| Aluminum foil 3 | A1050 | H18 | 155.8 | 56.5 | 220 | 5 | 2.57 |

Tensile strength TS, elongation EL, surface hardness Hv, and the dome height of Erichsen cupping test (Ericksen value) were determined as described below for each test material or each metal laminate material.

[Tensile Strength TS]

Tensile strength TS was determined in accordance with JIS Z 2241 (metal material tensile testing method) using Autograph AGS-5kNX (manufactured by Shimadzu Corporation).

[Elongation EL]

Elongation EL was measured in accordance with measurement of elongation after fracture specified in JIS Z 2241 for each test piece used in the tensile strength test.

[Surface Hardness Hv]

Surface hardness Hv was determined using a micro-Vickers hardness tester (load: 100 gf) in accordance with JIS Z 2244 (Vickers hardness test—test method).

[Dome Height in Erichsen Cupping Test]

The dome height in Erichsen cupping test was determined in accordance with JIS Z 2247 (method of Erichsen cupping test) using a mechanical Erichsen cupping tester ESM-1 (CAP2 mm, manufactured by Tokyo Koki Testing Machine Co., Ltd.).

First, a 1st stainless steel foil and an aluminum foil were sputter-etched. The 1st stainless steel foil was sputter-etched at 0.1 Pa, a plasma output of 800 W, and a line rate of 3.5 m/minute. The aluminum foil was sputter-etched at 0.1 Pa, a plasma output of 2600 W, and a line rate of 3.5 m/minute. Thus, the surface adsorbates of each of the 1st stainless steel foil and the aluminum foil were completely removed. The etching depth of the 1st stainless steel foil was approximately 2 nm, and the etching depth of the aluminum foil was approximately 6 nm. After sputter etching treatment, the 1st stainless steel foil and the aluminum foil were roll-bonded to be bonded together at ordinary temperature, at a linear load upon rolling of 2 tf/cm (rolling load: 0.4 MN), and a reduction rate of 0% to 1%. Thus, the two-layer material of the 1st stainless steel layer and the aluminum layer was obtained.

Next, the aluminum layer side of the two-layer material and the 2nd stainless steel foil were sputter-etched. The two-layer material was sputter-etched at 0.1 Pa, at a plasma output of 2600 W, and a line rate of 3.5 m/minute, and the 2nd stainless steel foil was sputter-etched at 0.1 Pa, a plasma output of 800 W, and a line rate of 3.5 m/minute. Thus, the surface adsorbates of each of the aluminum layer of the two-layer material and the 2nd stainless steel foil were completely removed. The etching depth of the aluminum layer of the two-layer material was approximately 6 nm, and the etching depth of the 2nd stainless steel foil was approximately 2 nm. Subsequently, the aluminum layer of the two-layer material and the 2nd stainless steel foil were roll-bonded to be bonded together at ordinary temperature, at a linear load upon rolling of 2 tf/cm (rolling load: 0.4 MN), and a reduction rate of 0% to 1%. Thus, the metal laminate material having the three-layer structure of the 1st stainless steel layer, the aluminum layer, and the 2nd stainless steel layer was obtained. The reduction rate of the finally obtained laminate material was calculated by the following formula 1, and it was approximately 1%.

(Sum of thicknesses of individual test materials− Thickness of laminate material)/(Sum of thicknesses of individual test materials)×100(%)     [Formula 1]

Table 2 lists characteristic values determined for metal laminate materials (as clad) obtained in Examples 1-1 and 2-1 and Comparative Example 1-1.

TABLE 2

| | Composition | Thickness (μm) | Surface Hardness Hv | Tensile Strength TS (MPa) | Elongation EL (%) | Dome Height (mm) |
|---|---|---|---|---|---|---|
| Example 1-1 | Stainless steel foil 1/ Aluminum foil 1/ | 195 | 203.34 | 472.1 | 53 | 7.6 |

TABLE 2-continued

| | Composition | Thickness (μm) | Surface Hardness Hv | Tensile Strength TS (MPa) | Elongation EL (%) | Dome Height (mm) |
|---|---|---|---|---|---|---|
| Example 2-1 | Stainless steel foil 1/ Stainless steel foil 2/ Aluminum foil 1/ Stainless steel foil 2 | 196 | 261.59 | 485.1 | 56 | 5.8 |
| Comparative Example 1-1 | Stainless steel foil 3/ Aluminum foil 1/ Stainless steel foil 3 | 194 | 373.93 | 691.9 | 10 | 3.4 |

As listed in Table 2, in the case of the metal laminate material, for which the tensile strength TS was 200≤TS≤550, the elongation EL was not less than 15%, and the surface hardness (Hv) of the stainless steel layer was not more than 300 (Examples 1-1 and 2-1), the dome height in Erichsen cupping test was not less than 4.6 mm, indicating high molding processability. Meanwhile, in the case of the metal laminate material, for which the tensile strength TS, elongation EL, and the surface hardness Hv of the stainless steel layer did not fall within the above ranges (Comparative Example 1-1), the dome height in Erichsen cupping test was less than 4.6 mm, indicating insufficient molding processability.

Each obtained metal laminate material (as clad) was further heat-treated at 250° C. for 30 minutes. Thus, the metal laminate materials corresponding to Examples 1-2 and 2-2 and Comparative Example 1-2 were obtained. In addition, the metal laminate materials corresponding to Example 3-2 and Comparative Example 2-2 were obtained in the same manner. Table 3 lists characteristic values of the heat-treated metal laminate materials. In addition, FIGS. 3 to 5 each summarize a relationship between dome height in Erichsen cupping test and the surface hardness Hv of the stainless steel layer, tensile strength TS, or elongation EL for the metal laminate materials before heat treatment (as clad) and the metal laminate materials after heat treatment.

TABLE 3

| | Composition | Thickness (μm) | Surface Hardness Hv | Tensile Strength TS (MPa) | Elongation EL (%) | Dome Height (mm) |
|---|---|---|---|---|---|---|
| Example 1-2 | Stainless steel foil 1/ Aluminum foil 1/ Stainless steel foil 1 | 195 | 204.9 | 467.1 | 42 | 8.1 |
| Example 2-2 | Stainless steel foil 2/ Aluminum foil 1/ Stainless steel foil 2 | 196 | 266.1 | 476.7 | 39 | 6.1 |
| Example 3-2 | Stainless steel foil 4/ Aluminum foil 2/ | 388 | 180.7 | 413.5 | 51 | 8.6 |

TABLE 3-continued

| | Composition | Thickness (μm) | Surface Hardness Hv | Tensile Strength TS (MPa) | Elongation EL (%) | Dome Height (mm) |
|---|---|---|---|---|---|---|
| Comparative Example 1-2 | Stainless steel foil 4/ Stainless steel foil 3/ Aluminum foil 1/ Stainless steel foil 3 | 194 | 375.9 | 698.0 | 12 | 3.6 |
| Comparative Example 2-2 | Stainless steel foil 5/ Aluminum foil 2/ Stainless steel foil 5 | 595 | 374.0 | — | — | 6.9 |

Figure 3:
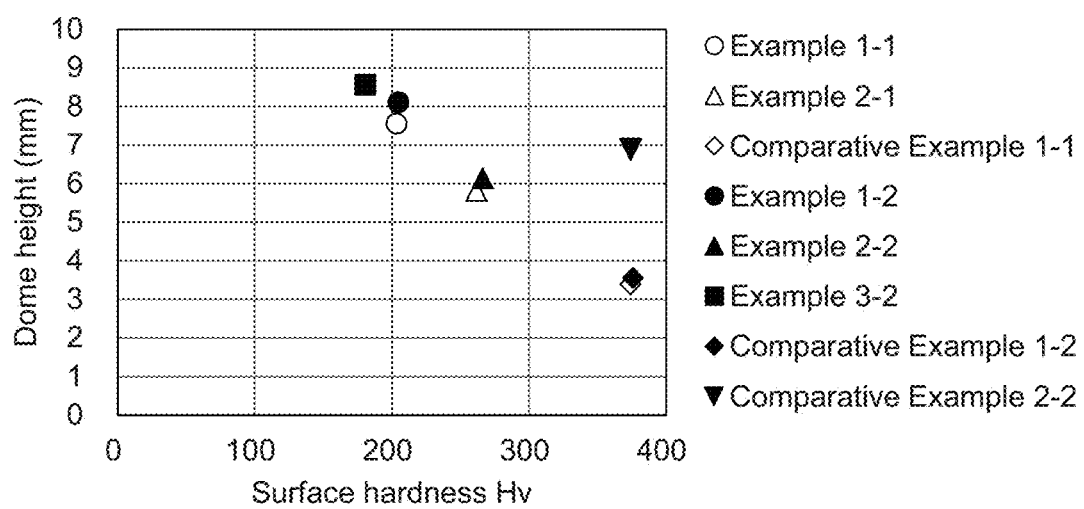
FIG. 3 is a graph indicating a relationship between surface hardness and dome height for metal laminate materials obtained in Examples 1 to 3 and Comparative Examples 1 to 2.
Figure 4:
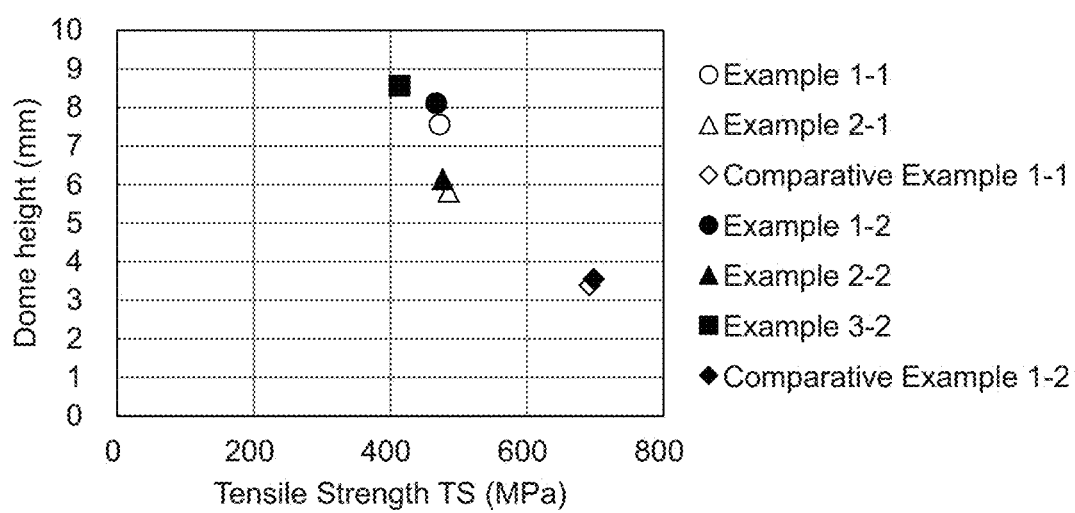
FIG. 4 is a graph indicating a relationship between tensile strength and dome height for metal laminate materials obtained in Examples 1 to 3 and Comparative Example 1.
Figure 5:
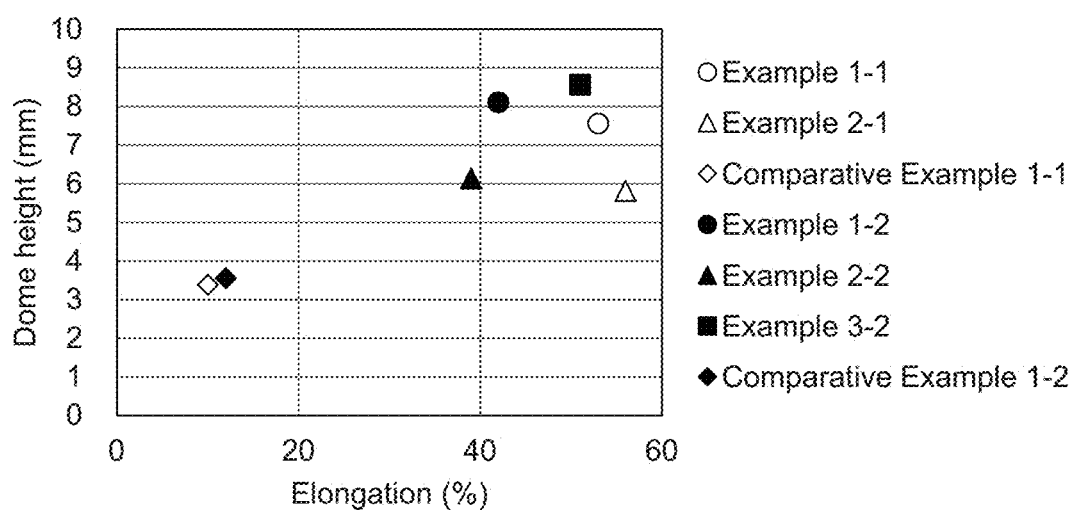
FIG. 5 is a graph indicating a relationship between elongation and dome height for metal laminate materials obtained in Examples 1 to 3 and Comparative Example 1.

As shown in Table 3 and FIGS. 3 to 5, in the case of the metal laminate material, for which the tensile strength TS was 200≤TS≤550, the elongation EL was not less than 15%, and the surface hardness Hv of the stainless steel layer was not more than 300 (Examples 1-2 to 3-2), the dome height in Erichsen cupping test was not less than 4.6 mm, indicating high molding processability. Meanwhile, in the case of the metal laminate material, for which the tensile strength TS, elongation EL, and surface hardness Hv did not fall within the above range (Comparative Example 1-2), the dome height in Erichsen cupping test was less than 4.6 mm, indicating insufficient molding processability. In addition, in a case in which the thickness of the metal laminate material was as large as 595 μm (Comparative Example 2-2), the dome height in Erichsen cupping test was not less than 4.6 mm while the surface hardness Hv of the stainless steel layer exceeded 300 for the obtained metal laminate material, indicating high molding processability.

In addition, based on Tables 2 and 3, it was revealed that heat treatment results in a relatively high dome height in Erichsen cupping test, which causes the improvement of molding processability.

Examples 4 and 5 and Comparative Example 3

The metal laminate material having the two-layer structure was produced using, as the stainless steel foil, any one of the stainless steel foils 1 to 3 in Table 1 and, as the aluminum foil, the aluminum foil 3 in Table 1.

First, the stainless steel foil and the aluminum foil were sputter-etched. The stainless steel foil was sputter-etched at 0.1 Pa, a plasma output of 800 W, and a line rate of 3.5 m/minute. The aluminum foil was sputter-etched at 0.1 Pa, a plasma output of 2600 W, and a line rate of 3.5 m/minute. Thus, the surface adsorbates of each of the stainless steel foil and the aluminum foil were completely removed. The etching depth of the stainless steel foil was approximately 2 nm, and the etching depth of the aluminum foil was approximately 6 nm. After sputter etching treatment, the stainless steel foil and the aluminum foil were roll-bonded to be bonded together at ordinary temperature, at a linear load upon rolling of 2 tf/c m (rolling load: 0.4 MN), and a reduction rate of 0% to 1%. Thus, the metal laminate material having the two-layer structure of the stainless steel layer and the aluminum layer was obtained.

Table 4 lists characteristic values determined for the metal laminate material (as clad) obtained in Example 4-1.

TABLE 4

|  | Composition | Thickness (μm) | Surface Hardness Hv[1] | Tensile Strength TS (MPa) | Elongation EL (%) | Dome Height[2] (mm) | Dome Height (mm) (Average) |
| --- | --- | --- | --- | --- | --- | --- | --- |
| Example 4-1 | Stainless steel foil 1/ Aluminum foil 3 | 205 | 200.4 57.0 | 313.8 | 39 | 6.7 6.0 | 6.4 |

[1]The value in the upper column corresponds to Surface Hardness Hv of the stainless steel layer, and the value in the lower column corresponds to Surface Hardness Hv of the aluminum layer.
[2]The value in the upper column is a value obtained by measurement using a center punch to mark on the stainless steel layer side, and the value in the lower column is a value obtained by measurement using a center punch to mark on the aluminum layer side.

As shown in Table 4, in the case of the metal laminate material in Example 4-1, for which the tensile strength TS was 200≤TS≤550, the elongation EL was not less than 15%, and the surface hardness Hv of the stainless steel layer was not more than 300, the dome height in Erichsen cupping test was not less than 4.6 mm, indicating high molding processability.

The obtained metal laminate material (as clad) in Example 4-1 was further heat-treated at 250° C. for 30 minutes, thereby obtaining the metal laminate material in Example 4-2. In addition, the metal laminate materials corresponding to Example 5-2 and Comparative Example 3-2 were obtained in the same manner. Table 5 lists characteristic values of the heat-treated metal laminate materials. In addition, FIGS. 6 to 8 each summarize a relationship between dome height in Erichsen cupping test (dome height (mm) (average) in Tables 4 and 5) and the surface hardness Hv of the stainless steel layer, tensile strength TS, or elongation EL for the metal laminate materials before heat treatment (as clad) and the metal laminate materials after heat treatment.

Figure 6:
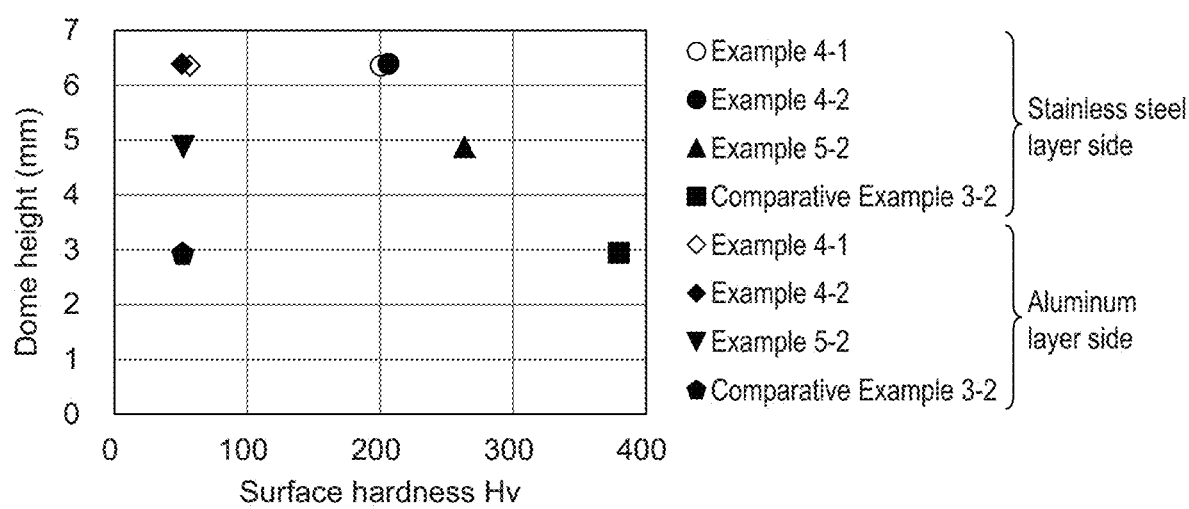
FIG. 6 is a graph indicating a relationship between surface hardness and dome height for metal laminate materials obtained in Examples 4 and 5 and Comparative Example 3.
Figure 7:
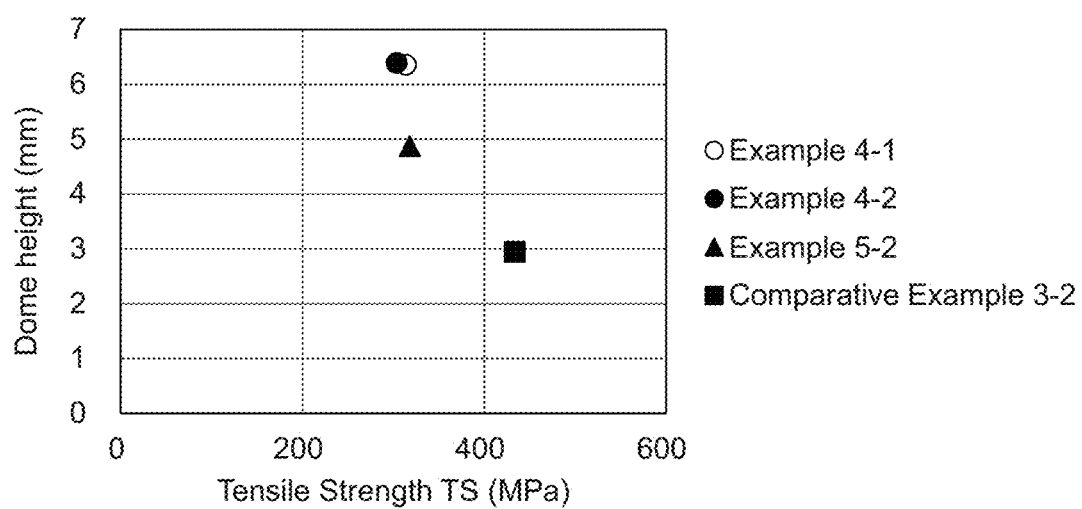
FIG. 7 is a graph indicating a relationship between tensile strength and dome height for metal laminate materials obtained in Examples 4 and 5 and Comparative Example 3.
Figure 8:
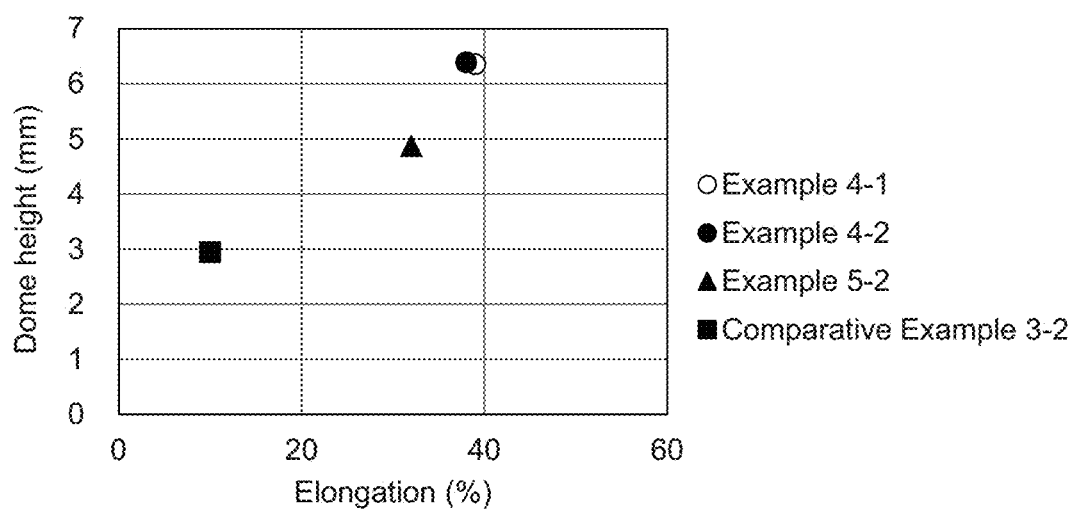
FIG. 8 is a graph indicating a relationship between elongation and dome height for metal laminate materials obtained in Examples 4 and 5 and Comparative Example 3.

As shown in Table 5 and FIGS. 6 to 8, in the case of the metal laminate material, for which the tensile strength TS was 200≤TS≤550, the elongation EL was not less than 15%, and the surface hardness Hv of the stainless steel layer was not more than 300 (Examples 4-2 to 5-2), the dome height in Erichsen cupping test was not less than 4.6 mm, indicating high molding processability. Meanwhile, in the case of the metal laminate material, for which the elongation EL and the surface hardness Hv of the stainless steel layer did not fall within the above ranges (Comparative Example 3-2), the dome height in Erichsen cupping test was less than 4.6 mm, indicating insufficient molding processability.

Example 6

In order to presume a preferable reduction rate for bonding a stainless steel foil and an aluminum foil or a two-layer material by pressure-bonding, the metal laminate material obtained in Example 3-2 was rolled at different reduction rates, and the dome height in Erichsen cupping test was determined for each of the rolled metal laminate materials. Table 6 lists the results. The metal laminate material in Example 3-2 corresponds to a reduction rate of 0% in Table 6.

TABLE 5

|  | Composition | Thickness (μm) | Surface Hardness Hv[1] | Tensile Strength TS (MPa) | Elongation EL (%) | Dome Height[2] (mm) | Dome Height (mm) (Average) |
| --- | --- | --- | --- | --- | --- | --- | --- |
| Example 4-2 | Stainless steel foil 1/ Aluminum foil 3 | 205 | 206.3 50.8 | 303.5 | 38 | 6.4 6.3 | 6.4 |
| Example 5-2 | Stainless steel foil 2/ Aluminum foil 3 | 205 | 263.3 51.5 | 318.0 | 32 | 4.8 4.9 | 4.9 |
| Comparative Example 3-2 | Stainless steel foil 3/ Aluminum foil 3 | 204 | 379.6 50.8 | 433.5 | 10 | 3.0 2.9 | 2.9 |

[1]The value in the upper column corresponds to Surface Hardness Hv of the stainless steel layer, and the value in the lower column corresponds to Surface Hardness Hv of the aluminum layer.
[2]The value in the upper column is a value obtained by measurement using a center punch to mark on the stainless steel layer side, and the value in the lower column is a value obtained by measurement using a center punch to mark on the aluminum layer side.

TABLE 6

| Reduction rate (%) | Thickness (μm) | Surface Hardness Hv | Tensile Strength TS (MPa) | Elongation (%) | Dome Height (mm) |
|---|---|---|---|---|---|
| 0 | 388 | 180.7 | 413.5 | 51 | 8.6 |
| 10 | 352 | 240.5 | 462.3 | 49 | 6.5 |
| 20 | 311 | 300.2 | 522.2 | 31 | 4.5 |
| 30 | 275 | 336.6 | — | — | 3.6 |
| 40 | 233 | 365.4 | — | — | 3.0 |
| 50 | 194 | 371.6 | 612.0 | 11 | 3.0 |

As shown in Table 6, when the reduction rate was not less than 20%, the dome height in Erichsen cupping test for each corresponding metal laminate material was less than 4.6 mm, resulting in insufficient molding processability of the metal laminate material. Meanwhile, when the reduction rate was not more than 10%, the dome height in Erichsen cupping test for each corresponding metal laminate material was not less than 4.6 mm, resulting in sufficient molding processability. Based on the above, it is presumed that the reduction rate for rolling the stainless steel foil and the aluminum foil or the two-layer material is preferably not more than 10%.

Example 7

<Evaluation of Average Crystal Grain Size>

Figure 9:
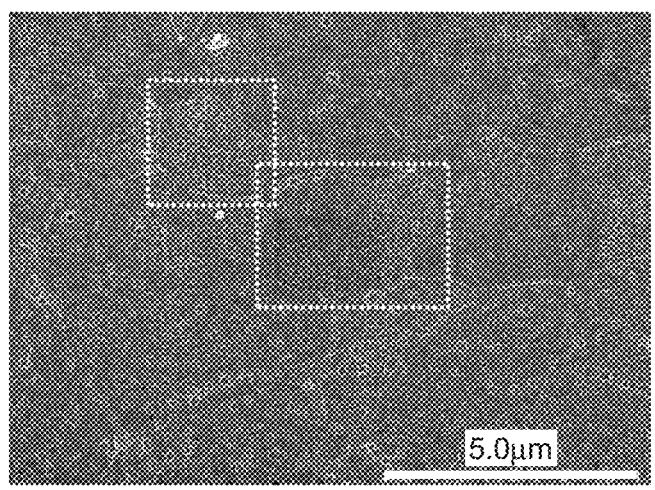
FIGS. 9A to 9C are cross-sectional observation images obtained by an electron scanning microscope (SEM) and used for calculation of the average crystal grain size.
Figure 9:
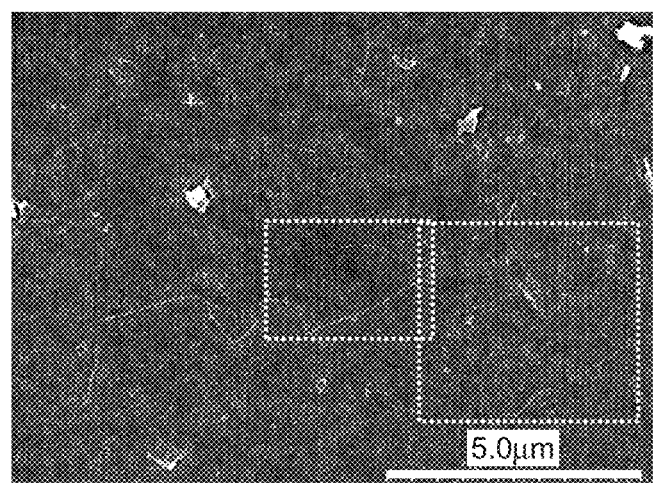
Figure 9:
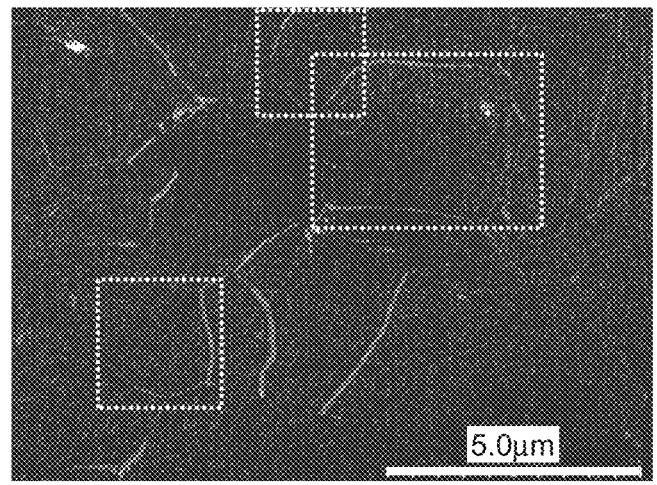
Figure 10:
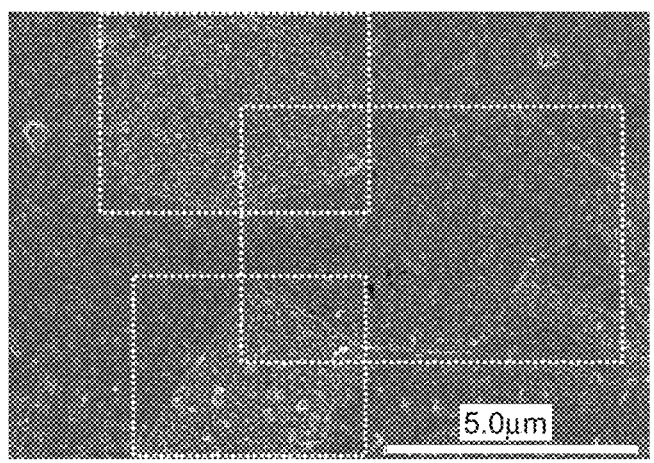
FIGS. 10A and 10B are cross-sectional observation images obtained by an electron scanning microscope (SEM) and used for calculation of the average crystal grain size.
Figure 10:
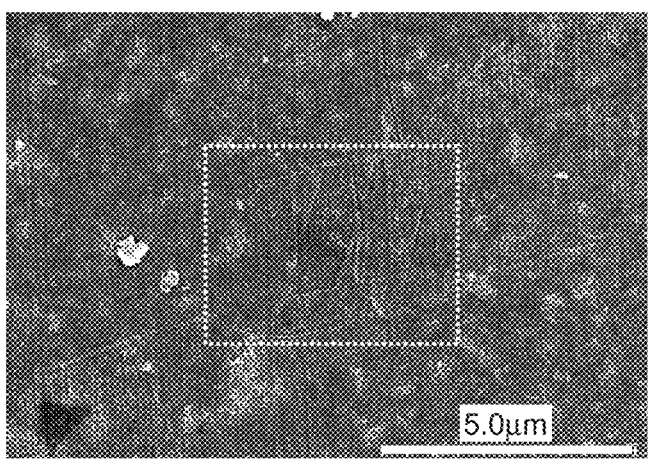

The average crystal grain size in the stainless steel layer was determined for the metal laminate materials in Examples 1-1, 1-2, and 2-2 as described below. First, each of samples of the metal laminate materials was immersed in about one-third dilution of aqua regia serving as a corrosive liquid for 10 to 15 minutes, thereby etching the stainless steel layer. Subsequently, a cross-section of the etched stainless steel layer of each sample was observed from TD in a sample coordinate system using SEM (electric-field-emission electron scanning microscope SU8020 manufactured by Hitachi High-Technologies Corporation). The average crystal grain size was calculated based on the above definition from each observation image. In addition, the average crystal grain size was determined also for a stainless steel foil 1 and a stainless steel foil 2 before bonding for reference. Table 7 lists the measurement results. FIGS. 9A to 9C are SEM observation images of the stainless steel foil 1, the bonded stainless steel foil 1 (as clad, corresponding to Example 1-1), and the bonded and heat-treated stainless steel foil 1 (corresponding to Example 1-2), respectively. FIGS. 10A to 10B are SEM observation images of the stainless steel foil 2 and the bonded and heat-treated stainless steel foil 2 (corresponding to Example 2-2). In the figures, each flamed portion shows a crystal grain.

TABLE 7

| Test material | | Bonded material (as clad) | | Heat-treated material | |
|---|---|---|---|---|---|
| Stainless steel foil 1 | 2.6 | Example 1-1 | 2.7 | Example 1-2 | 2.3 |
| Stainless steel foil 2 | 4.7 | Example 2-1 | — | Example 2-2 | 4.3 |

Unit: μm

As shown in Table 7, the average crystal grain size in the stainless steel layer fell within a range of 1.5 μm to 10 μm for the metal laminate materials having favorable molding processability in Example 1-1, 1-2, and 2-1. Shear bands were found in the stainless steel foil 3 (SUS316L H material) used for the metal laminate material in Comparative Example 1, which made it difficult to measure the crystal grain size.

<Evaluation of Shear Bands>

Next, for the metal laminate materials in Example 1-2 and Comparative Example 1-2, the number of shear bands traversing a straight line having a length of 10 μm, the straight line extending along ND in a sample coordinate system on a cross-sectional observation image viewed from TD in the sample coordinate system, was determined for the stainless steel layer according to the above definition. An apparatus used for measurement was the same as that used for evaluation of the average crystal grain size described above. In addition, the number of shear bands was determined in the same manner also for the stainless steel foil 1 and the stainless steel foil 3 before bonding for reference. Table 8 lists the measurement results. FIGS. 11A to 11B are SEM observation images of the stainless steel foil 1 and the bonded and heat-treated stainless steel foil 1 (corresponding to Example 1-2). FIGS. 12A to 12B are SEM observation images of the stainless steel foil 3 and the bonded and heat-treated stainless steel foil 3 (corresponding to Comparative Example 1-2). In FIG. 12, each arrow denotes a site at which a shear band traverses a straight line.

TABLE 8

| Test material | | Heat-treated material | |
|---|---|---|---|
| Stainless steel foil 1 | 0 | Example 1-2 | 0 |
| Stainless steel foil 3 | 6 | Comparative Example 1-2 | 16 |

Figure 11:
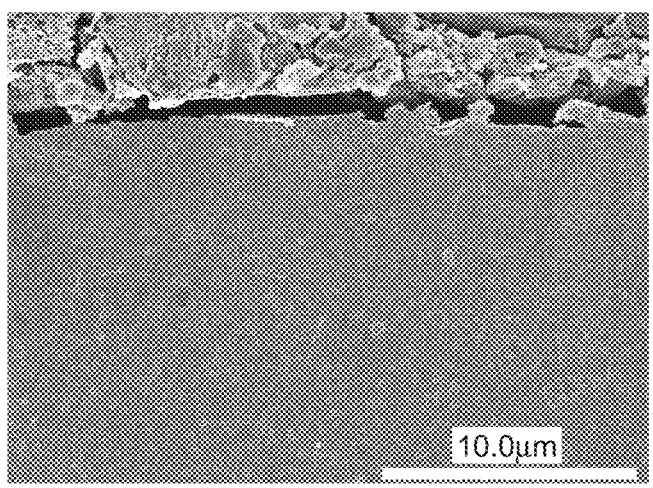
FIGS. 11A and 11B are cross-sectional observation images obtained by an electron scanning microscope (SEM) and used for evaluation of shear bands.
Figure 11:
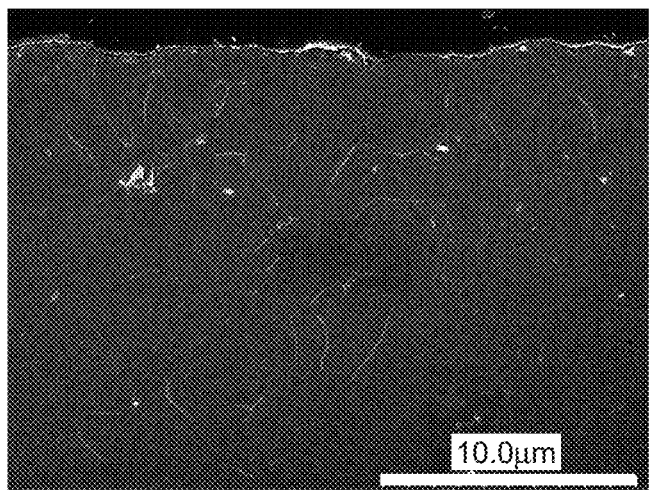
Figure 12:
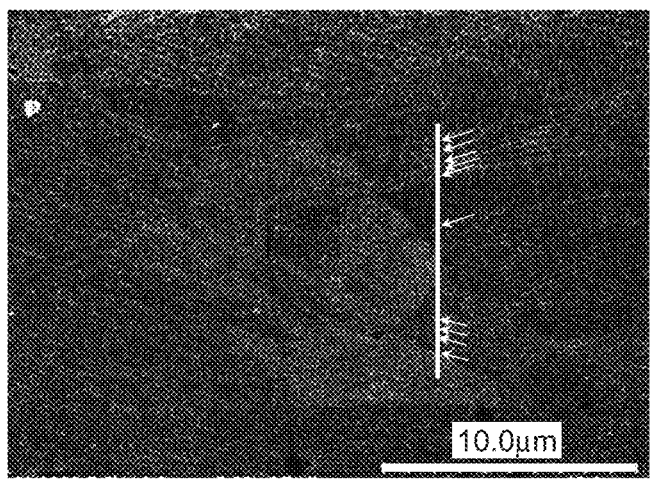
FIGS. 12A and 12B are cross-sectional observation images obtained by an electron scanning microscope (SEM) and used for evaluation of shear bands.
Figure 12:
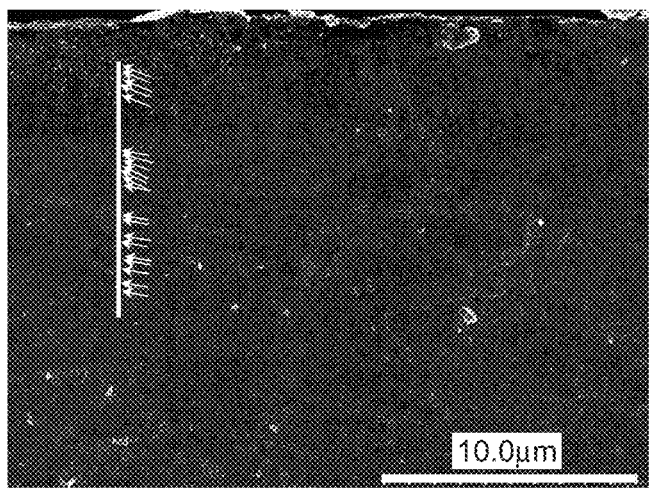

Each value in the table means the number of shear bands traversing a straight line As shown in Table 8 and FIG. 11, shear bands traversing the straight line were not observed in the stainless steel layer of the metal laminate material in Example 1-2. Shear bands were not observed in the stainless steel foil 1 before bonding as well. It is presumed that high molding processability of the metal laminate material was achieved by the stainless steel layer having no shear bands. Meanwhile, as many as 16 shear bands were observed in the stainless steel layer of the metal laminate material in Comparative Example 1-2, for which sufficient molding processability was not achieved. In addition, as many as 6 shear bands were observed even in the unbonded stainless steel foil 3.

REFERENCE SIGNS LIST

1: Metal laminate material
2: Metal laminate material
10: Aluminum layer
21: (1st) stainless steel layer
22: 2nd stainless steel layer All publications, patents and patent applications cited in the present description are incorporated herein by reference in their entirety.

The invention claimed is:

1. A metal laminate material, which has a two-layer structure of a SUS316L stainless steel layer and an aluminum layer or a three-layer structure of a 1st SUS316L stainless steel layer, an aluminum layer, and a 2nd SUS316L stainless steel layer,
wherein tensile strength TS is 200≤TS≤550 (MPa), elongation EL is not less than 15%, and a surface hardness Hv of each SUS316L stainless steel layer is not more than 300 for the metal laminate material, and wherein each SUS316L stainless steel layer has an average crystal grain size of 1.5 μm to 10 μm, and the number of shear bands traversing a straight line having a length of 10 μm, the straight line extending along the normal direction (ND) in a sample coordinate system on a cross-sectional observation image viewed from the transverse direction (TD) in the sample coordinate system, is less than 5 for the SUS316L stainless steel layer.

2. The metal laminate material according to claim 1, which has a thickness of 50 μm to 500 μm.

3. The metal laminate material according to claim 1, which has a dome height in Erichsen cupping test (Erichsen value) of not less than 4.6 mm.

4. A method for producing the metal laminate material having the two-layer structure of the stainless steel layer and the aluminum layer according to claim 1, which comprises:
   a step of sputter-etching a stainless steel foil having a surface hardness Hv of not more than 300;
   a step of sputter-etching an aluminum foil having a surface hardness Hv of not less than 20; and
   a step of pressure-bonding a sputter-etched side of the stainless steel foil and a sputter-etched side of the aluminum foil at a reduction rate of not more than 10%, thereby obtaining the metal laminate material having the two-layer structure of the stainless steel layer and the aluminum layer.

5. A method for producing the metal laminate material having the three-layer structure of a 1st stainless steel layer, an aluminum layer, and a 2nd stainless steel layer according to claim 1, which comprises:
   a step of sputter-etching the 1st stainless steel foil having a surface hardness Hv of not more than 300;
   a step of sputter-etching the aluminum foil having a surface hardness Hv of not less than 20; and
   a step of pressure-bonding a sputter-etched side of the 1st stainless steel foil and a sputter-etched side of the aluminum foil at a reduction rate of not more than 10%, thereby obtaining a two-layer material of a 1st stainless steel layer and an aluminum layer;
   a step of sputter-etching the aluminum layer side of the two-layer material;
   a step of sputter-etching the 2nd stainless steel foil having a surface hardness Hv of not more than 300; and
   a step of pressure-bonding a sputter-etched side of the two-layer material and a sputter-etched side of the 2nd stainless steel foil at a reduction rate of not more than 10%, thereby obtaining the metal laminate material having the three-layer structure of the 1st stainless steel layer, the aluminum layer, and the 2nd stainless steel layer.

6. The method for producing the metal laminate material according to claim 4, which further comprises a step of heat-treating the obtained metal laminate material at 100° C. to 500° C.

7. The method for producing the metal laminate material according to claim 5, which further comprises a step of heat-treating the obtained metal laminate material at 100° C. to 500° C.

* * * * *